US012132176B2

(12) United States Patent
Marbella et al.

(10) Patent No.: US 12,132,176 B2
(45) Date of Patent: Oct. 29, 2024

(54) METHODS FOR RECOVERING AND REUSING POLYMERIC BINDERS FROM COMPOSITE CATHODE FILMS

(71) Applicant: The Trustees of Columbia University in the City of New York, New York, NY (US)

(72) Inventors: Lauren Elizabeth Marbella, New York, NY (US); Amrita Sarkar, New York, NY (US); Richard May, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 297 days.

(21) Appl. No.: 17/500,077

(22) Filed: Oct. 13, 2021

(65) Prior Publication Data

US 2022/0115716 A1    Apr. 14, 2022

Related U.S. Application Data

(60) Provisional application No. 63/091,124, filed on Oct. 13, 2020.

(51) Int. Cl.
*H01M 10/42* (2006.01)
*B29B 17/02* (2006.01)
(Continued)

(52) U.S. Cl.
CPC ......... *H01M 10/4242* (2013.01); *B29B 17/02* (2013.01); *C08J 11/28* (2013.01);
(Continued)

(58) Field of Classification Search
CPC ... H01M 10/4242; H01M 4/623; B29B 17/02; C08J 11/28
See application file for complete search history.

(56) References Cited

U.S. PATENT DOCUMENTS 9,312,581 B2    4/2016  Laucournet et al.
9,614,261 B2    4/2017  Kepler et al.
(Continued)

FOREIGN PATENT DOCUMENTS

WO    2007088617 A1    8/2007

OTHER PUBLICATIONS

Georgi-Maschler, T., et al., "Development of a recycling processfor Li-ion batteries," Journal of Power Sources, vol. 207, pp. 173-182, Jun. 2012.

(Continued)

*Primary Examiner* — Matthew J Merkling
(74) *Attorney, Agent, or Firm* — Barclay Damon LLP; Anthony P. Gangemi

(57) ABSTRACT

Materials such as poly(vinylidene fluoride) (PVDF) and lithium cobalt (III) oxide (LCO) are recovered and recycled from cathode films isolated from end-of-life batteries, including lithium-ion batteries. Cathode films are immersed in solution including N,N-dimethylformamide (DMF), N-methyl-2-pyrrolidine (NMP), a tetrahydrofuran (THF):NMP mixture, or a THF:DMF mixture. The solution is able to dissolve PVDF, which can then be separated from LCO and a conductive substrate component of the cathode films via alumina column separation. A PVDF product can be precipitated and recovered, while the LCO and conductive substrate can be recovered directly from the alumina column separator. Both the PVDF and LCO are of suitable quality for use in new cathode films. Such recovery is shown to be achievable even at low solid to liquid ratio during the dissolution process. Thus, economically feasible solvent-based recycling of battery cathodes is enabled to prolong the service life of cathode materials and reduce polymeric waste.

20 Claims, 9 Drawing Sheets

(51) Int. Cl.
*C08J 11/28* (2006.01)
*H01M 4/62* (2006.01)

(52) U.S. Cl.
CPC ..... *H01M 4/623* (2013.01); *B29B 2017/0244* (2013.01); *B29B 2017/0289* (2013.01); *B29B 2017/0293* (2013.01); *C08J 2327/16* (2013.01)

(56) References Cited

U.S. PATENT DOCUMENTS

| | | | |
|---|---|---|---|
| 9,834,827 B2 | 12/2017 | Wang et al. | |
| 10,205,200 B2 | 2/2019 | Ho et al. | |
| 2013/0302226 A1* | 11/2013 | Wang | C22B 47/00 422/187 |
| 2014/0306162 A1* | 10/2014 | Poe | H01M 4/587 252/506 |
| 2015/0052739 A1* | 2/2015 | Deb | H01M 4/525 29/623.5 |
| 2021/0226273 A1* | 7/2021 | Park | B01D 9/0054 |
| 2021/0257685 A1* | 8/2021 | Belharouak | H01M 10/54 |
| 2022/0029217 A1* | 1/2022 | Young | H01M 4/525 |
| 2022/0216534 A1* | 7/2022 | Oosterhof | C22B 23/0461 |

OTHER PUBLICATIONS

Zhou, X., et al., "Recycling of Electrode Materials from Spent Lithium-Ion Batteries," 4th International Conference on Bioinformatics and Biomedical Engineering, Jun. 2010.

Chen, J., et al., "Environmentally friendly recycling and effective repairing of cathode powders from spent LiFePO4 batteries," Green Chemistry, vol. 18, Issue 8, pp. 2500-2506, Dec. 2015.

Lain, M.J., "Recycling of lithium ion cells and batteries," Journal of Power Sources, vols. 97-98, pp. 736-738, Jul. 2001.

Hanisch, C., et al., "Recycling of lithium-ion batteries: a novel method to separate coating and foil of electrodes," Journal of Cleaner Production, vol. 108, Part A, pp. 301-311, Dec. 2015.

He, K., et al., "Selectively peeling of spent LiFePO4 cathode by destruction of crystal structure and binder matrix for efficient recycling of spent battery materials," Journal of Hazardous Materials, vol. 386, Issue 15, Mar. 15, 2020.

* cited by examiner

METHODS FOR RECOVERING AND REUSING POLYMERIC BINDERS FROM COMPOSITE CATHODE FILMS

CROSS REFERENCE TO RELATED APPLICATION(S)

This application claims the benefit of U.S. Provisional Application No. 63/091,124, filed Oct. 13, 2020, which is incorporated by reference as if disclosed herein in its entirety.

BACKGROUND

The market for electric vehicles (EVs) has expanded dramatically in the past several years in a collective effort to combat the greenhouse gas emissions associated with climate change. By 2040, 500 million passenger EVs are expected to be on the road, all of which will likely be powered by lithium-ion batteries (LIBs). As a result, unprecedented amounts of LIB waste will be produced in the near future. Approximately 21 million tons of end-of-life battery waste will be generated by 2040. Although a very small percentage of polymer binder (2-4%) is used to construct a cell, battery waste of this magnitude will lead to a large accumulation of plastics from the binder. Recycling efforts focused on mitigating the environmental impact and hazards of this waste, as well as improving the re-use of battery materials for subsequent applications, are critical.

Ultimately, LIB recycling procedures that recover and reuse every component of the battery would be ideal and would match standards already in place for lead-acid batteries. LIB recycling techniques are comparatively nascent and thus, strategies have focused on recovering the most valuable component, e.g., Co from cathode films. For example, pyrometallurgy and hydrometallurgy processes use high temperature and/or chemical leaching to extract $Co^{2+}$ and $Ni^{2+}$ from composite cathodes. However, these processes produce raw salt precursors that require resynthesis of the active cathode materials (usually a layered transition metal oxide, e.g. $LiCoO_2$ (LCO), $LiNi_xMn_yCo_zO_2$ (NMC), or $LiNiCoAlO_2$ (NCA)).

There is no known method to recycle or re-use binder from end-of-life batteries, and poly(vinylidene fluoride) (PVDF) solvent-based approaches to remove PVDF and reuse the binder have not been examined. In general, polymeric materials are notoriously challenging to recycle for both economic and practical reasons, which has ultimately contributed to the dire plastic pollution epidemic. More recent research efforts have focused on direct cathode recycling. Direct cathode recycling is an emerging approach where the active material is recovered directly from the cathode composite, e.g., for immediate reuse in subsequent battery applications. To date, emphasis has been placed on using direct cathode recycling to recover expensive Co- and Ni-including active materials from the cathode composite.

However, incineration of fluorinated PVDF binder during direct cathode recycling produces greenhouse gas emissions and hydrogen fluoride (HF). Specifically, in direct cathode recycling, the active material is most commonly separated from the conductive carbon, the PVDF-based binder, and the Al current collector via pyrolysis, leading to complete destruction of PVDF and carbon. Pyrolysis of PVDF forms a variety of potent greenhouse gases and other chemical hazards, such as HF and perfluorocarbons, the former of which are then captured by acid scrubbers at recycling plants. Further, the formation of HF during pyrolysis deactivates layered cathode materials, leading to poor electrochemical performance and prompting subsequent relithiation.

SUMMARY

Some embodiments of the present disclosure are directed to a method of recovering materials from a cathode film including contacting a cathode film isolated from a battery with a solvent including N,N-dimethylformamide (DMF), N-methyl-2-pyrrolidine (NMP), a tetrahydrofuran (THF): NMP mixture, or a THF:DMF mixture, the cathode film including a binder including poly(vinylidene fluoride) (PVDF), dissolving the PVDF from the cathode film with the solvent to produce a product solution, and isolating a PVDF product solution from the product solution via alumina column separation. In some embodiments, the method includes concentrating the PVDF product solution under vacuum. In some embodiments, the method includes precipitating a PVDF product from the PVDF product solution in an ether solution. In some embodiments, the method includes retrieving an active material product from the alumina column.

In some embodiments, the cathode film is contacted with a THF:NMP mixture, and the volume ratio in the THF:NMP mixture is about 50:50. In some embodiments, the cathode film is contacted with a THF:DMF mixture, and the volume ratio in the THF:DMF mixtures is about 50:50. In some embodiments, the ratio of solid cathode film to solvent is between about 1:1 g:mL and about 1:7 g:mL. In some embodiments, the average molecular weight of PVDF in the PVDF product is between about 400 kDa and about 950 kDa.

Some embodiments of the present disclosure are directed to a method of recovering materials from a cathode film including isolating a cathode film from a battery, the cathode film including a binder, an active material, and a conductive substrate, wherein the binder includes poly(vinylidene fluoride) (PVDF), washing the cathode film with an electrolyte, washing the cathode film with one or more first solvents to remove the electrolyte, contacting the cathode film with a second solvent including N,N-dimethylformamide (DMF), N-methyl-2-pyrrolidine (NMP), a tetrahydrofuran (THF): NMP mixture, or a THF:DMF mixture to form a product solution, applying the product solution to an alumina column separator to isolate a PVDF product solution from the product solution, and precipitating a PVDF product from the PVDF product solution. In some embodiments, the method includes retrieving an active material product from the alumina column. In some embodiments, the method includes retrieving a conductive substrate product from the alumina column.

In some embodiments, applying the product solution to an alumina column separator includes diluting the product solution between about 5 times and about 10 times with THF. In some embodiments, applying the product solution to an alumina column separator includes passing the product solution through an alumina column separator two or more times. In some embodiments, contacting the cathode film with a second solvent further comprises a heat application process, a sonication process, or combinations thereof.

In some embodiments, the second solvent is a THF:NMP mixture, and the volume ratio in the THF:NMP mixture is about 50:50. In some embodiments, the second solvent is a THF:DMF mixture, and the volume ratio in the THF:DMF mixtures is about 50:50. In some embodiments, the ratio of solid cathode film to second solvent is between about 1:1 g:mL and about 1:7 g:mL. In some embodiments, the average molecular weight of the precipitated PVDF is between about 400 kDa and about 950 kDa.

Some embodiments of the present disclosure are directed to a method of producing a battery from recycled materials including isolating a cathode film from an end-of-life battery, the cathode film including a binder including poly (vinylidene fluoride) (PVDF), washing the cathode film with an electrolyte, washing the cathode film with one or more first solvents to remove the electrolyte, drying the cathode film, immersing the dried cathode film with a second solvent including N,N-dimethylformamide (DMF), N-methyl-2-pyrrolidine (NMP), a tetrahydrofuran (THF):NMP mixture, or a THF:DMF mixture to form a product solution, passing the product solution through an alumina column separator, isolating a PVDF product solution from the product solution, precipitating a PVDF product from the PVDF product solution, and incorporating the PVDF product as a binder in a new cathode film. In some embodiments, the method includes retrieving an active material product from the alumina column. In some embodiments, the method includes incorporating the active material product into a new cathode film. In some embodiments, immersing the dried cathode film with a second solvent further includes a heat application process, a sonication process.

In some embodiments, the second solvent is a THF:NMP mixture having a volume ratio of about 50:50 or a THF:DMF mixture having a volume ratio of about 50:50. In some embodiments, the ratio of solid cathode film to second solvent is between about 1:1 g:mL and about 1:7 g:mL.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DESCRIPTION

Figure 1:
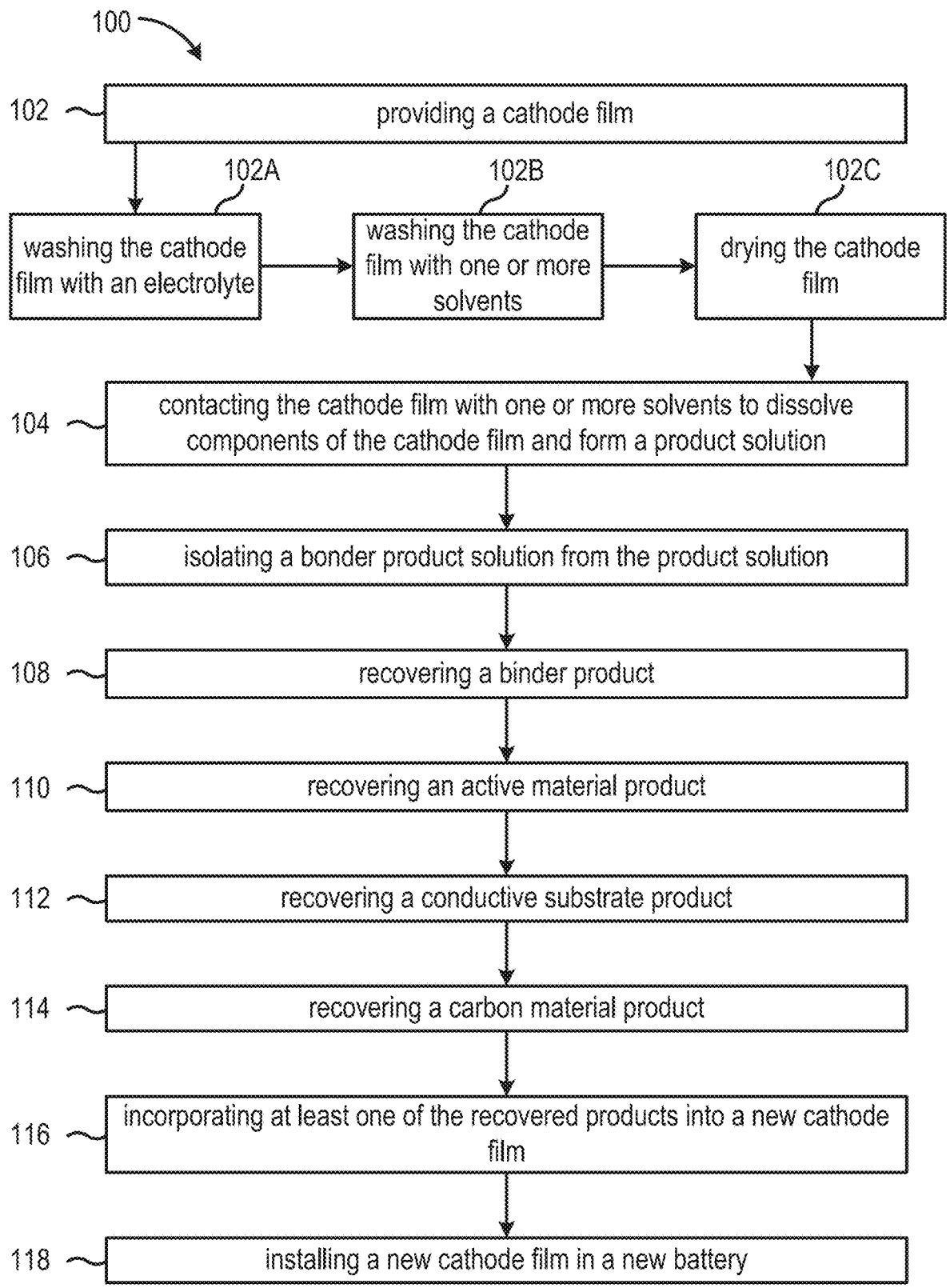
FIG. 1 is a chart of a method of recovering materials from a cathode film according to some embodiments of the present disclosure.

Referring now to FIG. 1A, some aspects of the present disclosure are directed to a method 100 of recovering materials from a cathode film. At 102, a cathode film is provided. In some embodiments, the cathode film is isolated from a battery, e.g., a commercially available battery such as a Samsung 18650 (2600 mAh) battery. In some embodiments, the battery is an "end-of-life" battery. As used herein, an "end-of-life" battery refers to a battery that has been subjected to multiple charge/discharge cycles, e.g., between about 700 and about 1,000 cycles or more, and/or may be exhibiting some degradation in performance as a result of prolonged use. In some embodiments, the cathode film includes a binder component including one or more binders. In some embodiments, the binder includes poly(vinylidene fluoride) (PVDF), polytetrafluoroethylene, rubbers, or combinations thereof. As used herein, the term "PVDF" includes pure PVDF and substantially pure PVDF, as well as PVDF co-polymers, e.g., PVDF-HFP (poly(vinylidene fluoride-co-hexafluoropropylene)), poly(vinylidene fluoride-co-chloro-trifluoroethylene) (PVDF-CTFE), etc. In some embodiments, the cathode film includes an active material component including one or more active materials. In some embodiments, the active material includes lithium cobalt (III) oxide (LCO), LiNi$_x$Mn$_y$Co$_z$O$_2$, LiNi$_x$Co$_y$Al$_z$O$_2$ (NCA), LiFePO$_4$ (LFP), LiMn$_2$O$_4$ (LMO), LiNi$_{2-x}$Mn$_x$O$_4$ (LNMO), etc. In some embodiments, the cathode film includes a carbon source component including one or more carbon sources. In some embodiments, the carbon source includes carbon black, carbon Super P, carbon nanotubes, graphite. In some embodiments, the cathode film includes a conductive substrate component. In some embodiments, the conductive substrate includes any suitable metal or combination of the metals, e.g., aluminum, suitable for use with the materials discussed above. In some embodiments, the cathode films are not broken down prior to treatment, e.g., the start of method 100. In some embodiments, the cathode films are at least partially broken down into smaller pieces at the start of or during method 100.

In some embodiments, at 102A, the cathode film is washed with an electrolyte, e.g., lithium hexafluorophosphate (LiPF$_6$) solution in a mixture of ethyl carbonate (EC) and dimethyl carbonate (DMC). In some embodiments, at 102B, the cathode films are then washed with one or more solvents, e.g., DMC, to remove the electrolyte. In some embodiments, at 102C, the cathode films are then dried.

At 104, the cathode film is contacted with one or more solvents to dissolve components of the cathode film and form a product solution. In some embodiments, the cathode film is immersed in the solvent, sprayed with the solvent, etc., or combinations thereof. In some embodiments, the solvent is effective to dissolve one or more binders, e.g., PVDF, of the cathode film, and/or separate the binders from the active material component, conductive substrate component, etc. In some embodiments, the solvent is able to extract binder from multiple different electrodes that have undergone different practical uses during their lifetime. In some embodiments, the solvent includes N,N-dimethylformamide (DMF), N-methyl-2-pyrrolidine (NMP), a tetrahydrofuran (THF):NMP mixture, or a THF:DMF mixture. In some embodiments, the volume ratio of the THF:NMP mixture is between about 45:55 and about 55:45. In some embodiments, the volume ratio of the THF:NMP mixture is about 50:50. In some embodiments, the volume ratio of the THF:DMF mixture is between about 45:55 and about 55:45. In some embodiments, the volume ratio of the THF:DMF mixture is about 50:50. In some embodiments, the ratio of solid cathode film to solvent at contacting step 104 is between about 1:1 g:mL and about 1:100 g:mL. In some embodiments, the ratio of solid cathode film to solvent is between about 1:1 g:mL and about 1:20 g:mL. In some embodiments, the ratio of solid cathode film to solvent is between about 1:1 g:mL and about 1:10 g:mL. In some embodiments, the ratio of solid cathode film to solvent is between about 1:1 g:mL and about 1:7 g:mL. In some embodiments, the ratio of solid cathode film to solvent is between about 1:5 g:mL and about 1:7 g:mL. In some embodiments, the ratio of solid cathode film to solvent is about 1:6 g:mL.

In some embodiments, contacting 104 the cathode film with the solvent includes a heat application process, a sonication process, or combinations thereof to aid dissolution of the binder component. In some embodiments, the cathode films are contacted with the solvent at a target temperature. In some embodiments, the target temperature is between about 70° C. and 100° C. In some embodiments, the target temperature is between about 80° C. and 90° C. In some embodiments, the cathode films are contacted with the solvent for a target duration. In some embodiments, the target duration is greater than about 20 minutes. In some embodiments, the target duration is between about 1 hour and 5 hours. In some embodiments, the target duration is between about 1.5 hours and 4 hours.

At 106, a binder product solution, e.g., PVDF product solution, is isolated from the product solution. The binder product solution includes a concentration of binder dissolved during contacting step 104 above. In some embodiments, the binder product solution is isolated via one or more column separation processes. In some embodiments, the binder product solution is isolated via alumina column separation. In some embodiments, the product solution is applied to an alumina column separator. In some embodiments, the product solution is passed through the alumina column separator. While a PVDF product solution is allowed the pass through, active material and conductive substrate components are not, effectively isolating PVDF from other components of the cathode film. In some embodiments, the volume of the product solution is diluted between about 5 times and about 10 times before being applied to the alumina column separator. In some embodiments, the product solution is diluted with THF. In some embodiments, the product solution is passed through an alumina column separator two or more times.

At 108, a binder product is recovered, e.g., a PVDF product is recovered from the PVDF product solution. In some embodiments, the binder product solution is concentrated under vacuum. In some embodiments, a binder product is precipitated via application of another solution, e.g., an ether solution such as diethyl ether. In some embodiments, one or more other separation techniques are employed to recover the binder product, e.g., ultracentrifugation, flash chromatography, filtration, etc. In some embodiments, the average molecular weight of PVDF in the PVDF product is between about 400 kDa and about 950 kDa.

In some embodiments, as the binder product solution passes through the column separator, other components of the product solution remain on and/or in the separator. At 110, an active material product is recovered, e.g., an LCO product from the product solution. In some embodiments, the active material product is retrieved from the alumina column separator, e.g., scraped from the top of the column. At 112, a conductive substrate product is recovered, e.g., aluminum metal pieces from the product solution. In some embodiments, the conductive substrate component is retrieved from the alumina column separator, e.g., removed from the top of the column. At 114, a carbon material product is recovered, e.g., carbon black from the product solution. In some embodiments, the carbon material component is retrieved from the alumina column separator, e.g., scraped from the top of the column.

At 116, at least one of the recovered products is incorporated into a new cathode film. In some embodiments, the binder product, e.g., PVDF, is incorporated into a cathode film as a binder. In some embodiments, the active material product, e.g., LCO, is incorporated into a cathode film as the active material. In some embodiments, the conductive substrate product, e.g., aluminum metal, is incorporated into a cathode film as the conductive substrate. In some embodiments, the carbon material product, e.g., carbon black, is incorporated into a cathode film as a carbon source. At 118, the new cathode film is installed in a new battery, thus recycling and prolonging the lifecycle of the materials from an end-of-life battery.

EXAMPLES

In an exemplary embodiment consistent with above disclosure, the solubility behavior to delaminate and separate PVDF binder from both homemade and commercial (Samsung) composite cathode films after extended cycling was performed. A characterization of polymer binder physical properties post-recovery using nuclear magnetic resonance (NMR) spectroscopy, gel permeation chromatography (GPC), wide-angle X-ray scattering (WAXS), scanning electron microscopy (SEM), and powder X-ray diffraction (PXRD) was performed. Finally, the performance of solvent-recovered PVDF in subsequent Li-ion battery composite cathodes was evaluated together with an energy intensity analysis to understand the economics associated with binder recycling.

A range of pure and binary organic solvents were investigated related to solubilizing PVDF (DMF, NMP, THF, and mixtures thereof, Table 1) and isolating the binder from composite cathode films. For PVDF recovery, both homemade (for solubility tests, cast films were soaked in electrolyte prior to PVDF recovery) and commercial composite cathode films were cut into pieces and suspended in the solvent at 90° C. for 1.5 h to evaluate the extent of PVDF dissolution. Cells underwent long term cycling prior to PVDF recovery. After delamination, the reaction mixture was fed through an alumina column to separate the polymeric binder from the active materials, carbon black, and Al current collector.

Although pristine PVDF was soluble in all of the organic solvents tested (DMF, NMP, THF, THF:NMP 80:20, THF:DMF 80:20, THF:NMP 50:50, THF:DMF 50:50), a subset of these solvents dissolved PVDF from all composite cathode films on Al substrates (DMF, NMP, THF:NMP 50:50, THF:DMF 50:50). PVDF films recovered from DMF-including solutions were more yellow in color (see Table 1). Without wishing to be bound by theory, this suggests that DMF alters the physical properties of the polymer (pristine PVDF is a white powder). THF, NMP, and mixtures thereof led to clear/white films. The PVDF recovered from the Samsung batteries was darker than the homemade films, suggesting, without wishing to be bound by theory, the presence of minor impurities post-cycling, such as residual carbon black, PVDF copolymers, minor impurities in solvents, or changes in the material from electrochemical cycling. It was found that the addition of more volatile THF allowed advantageous removal of solvent. A THF:NMP (50:50 v/v) binary solvent mixture was used for all subsequent PVDF recovery experiments.

TABLE 1

PVDF binder solubility in organic solvents and binary mixtures. All solubility experiments were performed with S/L ratio of 1:100 g:mL at T = 90° C.

| PVDF Type | THF only | DMF only | NMP only | THF + NMP (80:20)(v/v) | THF + DMF (80:20)(v/v) | THF + NMP (50:50)(v/v) | THF + DMF (50:50)(v/v) |
|---|---|---|---|---|---|---|---|
| Pristine PVDF (MTI) | [a]+ | + | + | + | + | + | + |
| PVDF recovered from homemade cathode films | – | + | + | – | – | + | + |
| PVDF recovered from Samsung battery cathodes | – | + | + | – | – | + | + |

[a]Solubility experiment conducted at T = 60° C. (–) insoluble, (+) soluble.

PVDF recovery yields of 81±3% and 69±3% were achieved for homemade composite LCO and NMC111 films, respectively, upon precipitation and solvent removal (see Table 2). Similarly, commercial composite films extracted from Samsung batteries showed PVDF recoveries of 62±5% for cells when cycled at 1 C for 920 cycles at 40° C. (Cell A) prior to disassembly. Cell B was cycled at 1 C for 792 cycles at 5° C. showed PVDF recovery values of 74±5%. In total, the percent recovery range spans from 60-80% and may depend on prior conditions. Without wishing to be bound by theory, PVDF loss during recovery is primarily attributed to the alumina column/flask and not residual PVDF on the active material based on the fact that pristine active materials are observed in SEM analyses. Further, the changes in PVDF recovery for different active materials and electrochemical cycling conditions observed here suggest that modifying binder-particle interactions via chemistry or electrochemical treatment may impact binder removal and are currently under investigation. It is noted that the PVDF film recovered from the Samsung batteries is darker than the homemade films, suggesting the presence of minor impurities post-cycling. It is expected that the PVDF used in commercial cells may also differ slightly in molecular weight or structure, e.g., a PVDF co-polymer, such as PVDF-HFP (poly(vinylidene fluoride-co-hexafluoropropylene)), or poly(vinylidene fluoride-co-chlorotrifluoroethylene) (PVDF-CTFE)).

Figure 2:
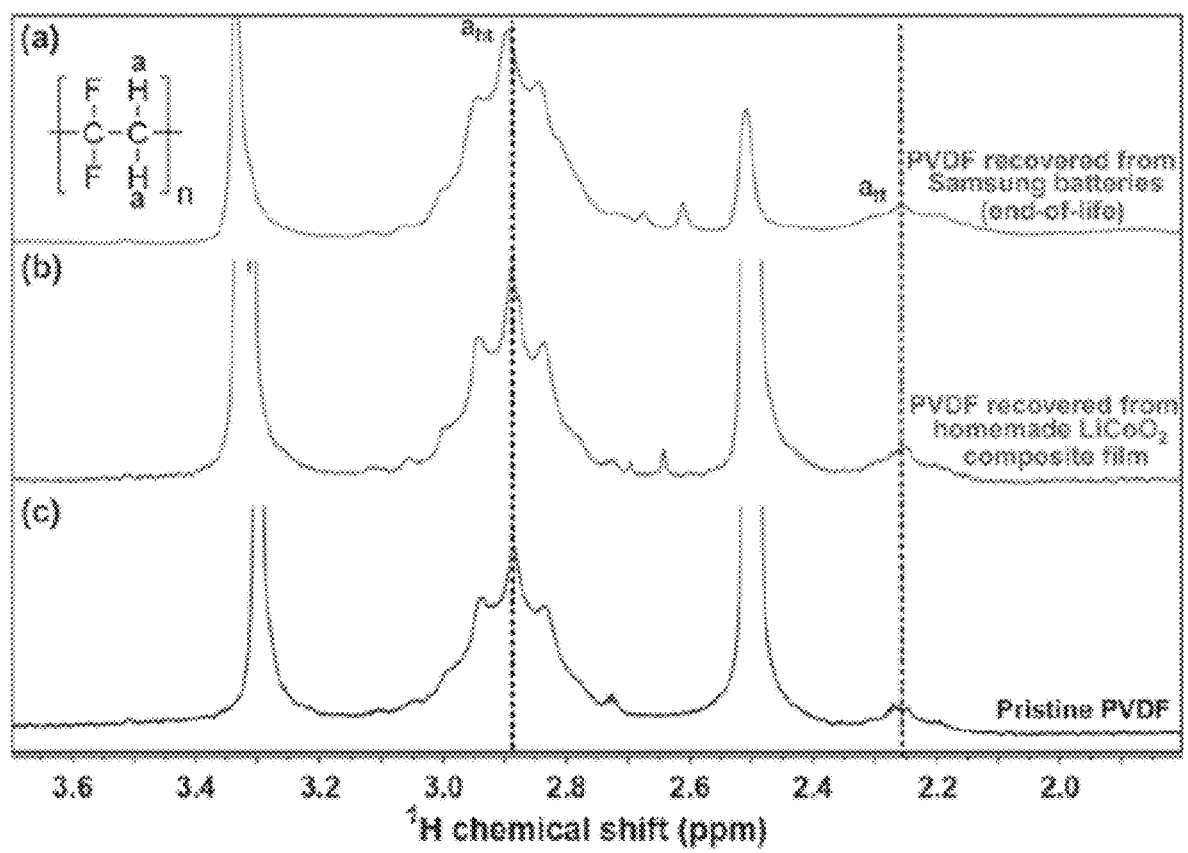
FIG. 2 is a graph portraying $^1$H nuclear magnetic resonance (NMR) spectra recorded in DMSO-$d_6$ of poly(vinylidene fluoride) (PVDF) recovered according to some embodiments of the present disclosure from a commercial Samsung 18650 battery (Cell A, 920 cycles at 40° C.) (a), a homemade lithium cobalt (III) oxide (LCO) composite film (soaked in LP30 electrolyte for 48 h) (b), and pristine PVDF (c)

Referring now to FIG. 2, PVDF recovered from the composite cathodes listed in Table 2 was characterized by $^1$H NMR, gel permeation chromatography (GPC), 1D wide angle X-ray scattering (WAXS), and scanning electron microscopy (SEM) and compared to pristine PVDF, i.e., the same PVDF that was used to make the homemade composite films from MTI. Analysis with $^1$H NMR showed the presence of resonances at 2.88 and 2.27 ppm that were assigned to head-to-tail (ht) and tail-to-tail (tt) bonding arrangements, respectively, of vinylidene fluoride units in PVDF. The dotted line drawn through these peaks, comparing pristine PVDF to PVDF recovered from cathode films, shows that the molecular-level structure of PVDF remains intact after recovery. A small, high frequency shift (2.89 ppm) is observed for the $^1$H ht resonance between the PVDF recovered from commercial films when compared to pristine PVDF. While this may be a result of small changes in PVDF structure, without wishing to be bound by theory, it is more likely that the binder used in industry to fabricate commercial cells has a slightly different molecular structure than the pristine PVDF. The $^1$H NMR recovered from both Samsung cells (Cell A and Cell B) was nearly identical and thus, all subsequent characterizations focus on Cell A.

Figure 3:
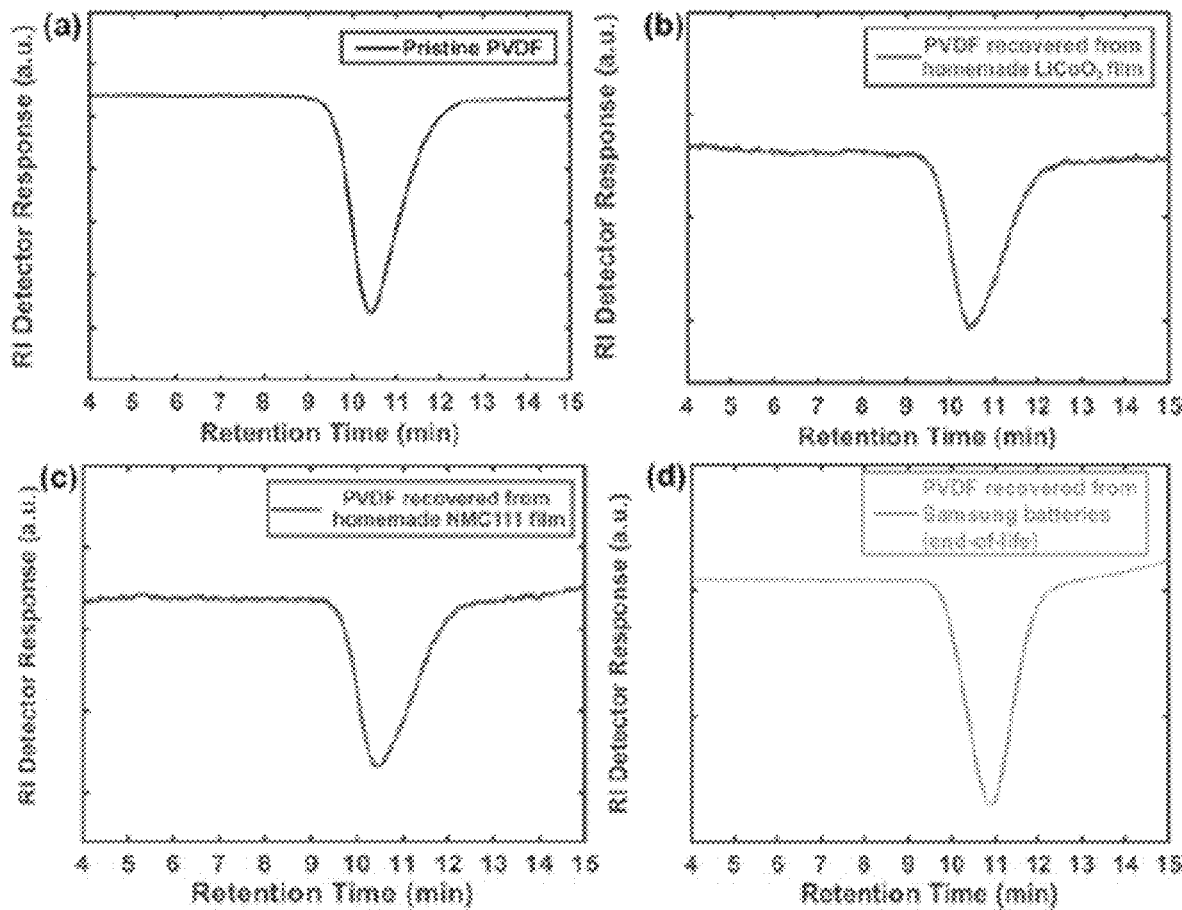
FIG. 3 is a graph of refractive index (RI) gel permeation chromatography (GPC) traces of commercially-purchased pristine PVDF (a) and PVDF recovered according to some embodiments of the present disclosure from homemade composite LCO (b) and lithium nickel manganese cobalt oxide (NMC111) films soaked in LP30 electrolyte for 48 h (c), and a commercial Samsung battery (Cell A, 920 cycles at 40° C.) (d)

Referring now to FIG. 3, GPC elugrams for pristine PVDF and PVDF recovered from homemade composite cathode films all fall in the same retention time range of 10.40-10.43 min. The pristine PVDF sample showed

TABLE 2

Summary of composite cathode film properties and PVDF recovery parameters with THF:NMP (50:50 v/v).

| Battery Type | Mass of cathode + Al (mg) | Mass of Al current collector (mg) | Mass of composite cathode film (mg) | Mass of PVDF in film (mg) | Mass of PVDF recovered (mg) | % Recovery | Volume of THF:NMP (mL) | S/L ratio (g:mL) |
|---|---|---|---|---|---|---|---|---|
| Soaked Homemade Film (LCO) | 453 | 142 | 311 | 31 | 25 | 81 | 50 | 1:110 |
|  | 820 | 218 | 602 | 60 | 48 | 80 | 100 | 1:122 |
|  | 704 | 365 | 339 | 34 | 25 | 74 | 50 | 1:71 |
|  | 551 | 164 | 387 | 39 | 34 | 87 | 60 | 1:109 |
| Soaked Homemade Film (NMC111) | 756 | 202 | 554 | 55 | 38 | 55 | 100 | 1:132 |
|  | 805 | 386 | 419 | 42 | 37 | 88 | 80 | 1:99 |
|  | 340 | 199 | 141 | 14 | 9 | 64 | 25 | 1:73 |
| Samsung Battery (Cell A, 920 cycles at 40° C.) | 1,200 | 140 | 1,060 | 32 | 20 | 63 (47-94) | 160 | 1:133 |
|  | 7,000 | 860 | 6,140 | 184 | 93 | 51 (38-76) | 1,000 | 1:143 |
|  | 3,300 | 415 | 2,885 | 87 | 45 | 52 (39-75) | 500 | 1:151 |
| Samsung Battery (Cell B, 792 cycles at 5° C.) | 12,000 | 5,000 | 7,000 | 210 | 165 | 79 (59-118) | 1,200 | 1:100 |
|  | 10,611 | 2,180 | 8,431 | 253 | 230 | 91 (68-136) | 1,400 | 1:132 |

$M_w$=926 k g/mol and Đ=3.04 and the PVDF recovered from homemade LCO composite film showed $M_w$=855 k g/mol and Đ=2.07. The PVDF recovered from homemade NMC111 composite film showed $M_w$=706 k g/mol and Đ=2.54. Molecular weights and dispersities were estimated from a calibration curve constructed from a series of polymethyl methacrylate (PMMA) standards. However, the determination of molecular weights from GPC may not be absolutely quantitative because the GPC calibrating agent, PMMA, gives positive RI signal whereas the PVDF gives a negative signal. Since the same PVDF was used for the pristine sample to prepare the homemade composite films, it was concluded that the similarities in the retention times, molecular weights, and dispersities all suggest that little to no structural degradation occurs during the recovery process. PVDF recovered from a Samsung 18650 battery after long-term cycling gave GPC elugrams with slightly higher retention time (~10.90 min), corresponding to average $M_w$ ~424 k g/mol and Đ=2.43. Without wishing to be bound by theory, these differences in retention times between the commercial film and the PVDF used in the laboratory are consistent with the small changes in frequency observed in $^1$H NMR and suggest a slightly different structure for industrial PVDF.

Figure 4:
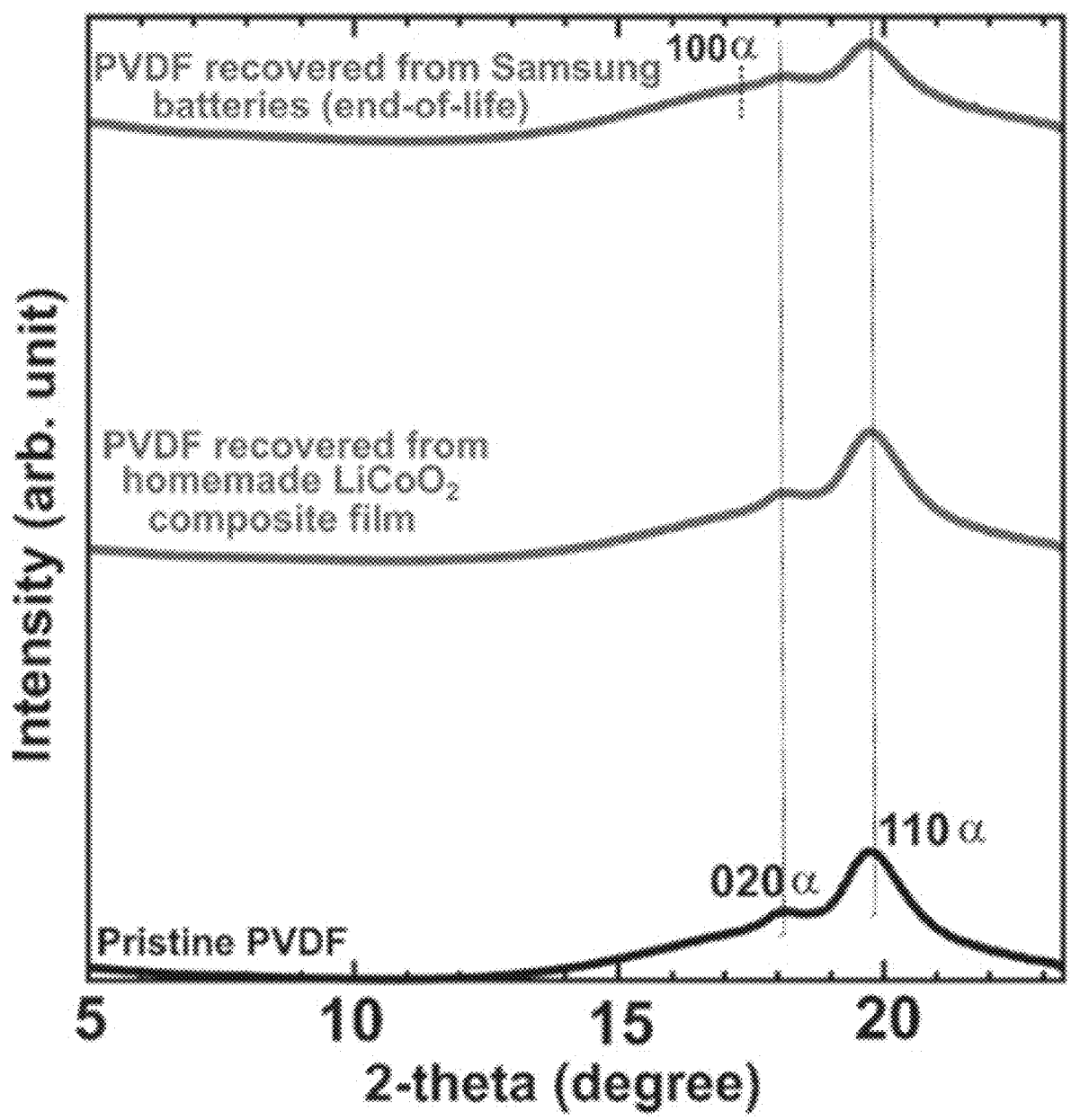
FIG. 4 is a graph of 1D wide angle X-ray scattering (WAXS) intensity profiles of pristine PVDF powder (black) compared to PVDF recovered according to some embodiments of the present disclosure from homemade composite LCO films (red) and a Samsung battery (Cell A) after 920 cycles at 40° C. (green)

Referring now to FIG. 4, WAXS of pristine PVDF powder is semicrystalline in nature, displaying a phase reflections at 18.5° and 20° that correspond to the (020) and (110) lattice planes. These reflections are retained in PVDF recovered from composite films, indicating that there are no changes in long-range order in the material upon recovery. An additional broad shoulder with a center of mass at approximately 17.5°, consistent with the (100) reflection in the a phase, is found in the PVDF recovered from the Samsung battery Cell A. No sharp reflections from the active material LCO (2θ=17.9°) are detected in recovered PVDF samples, suggesting that the PVDF is at least substantially pure.

Figure 5A:
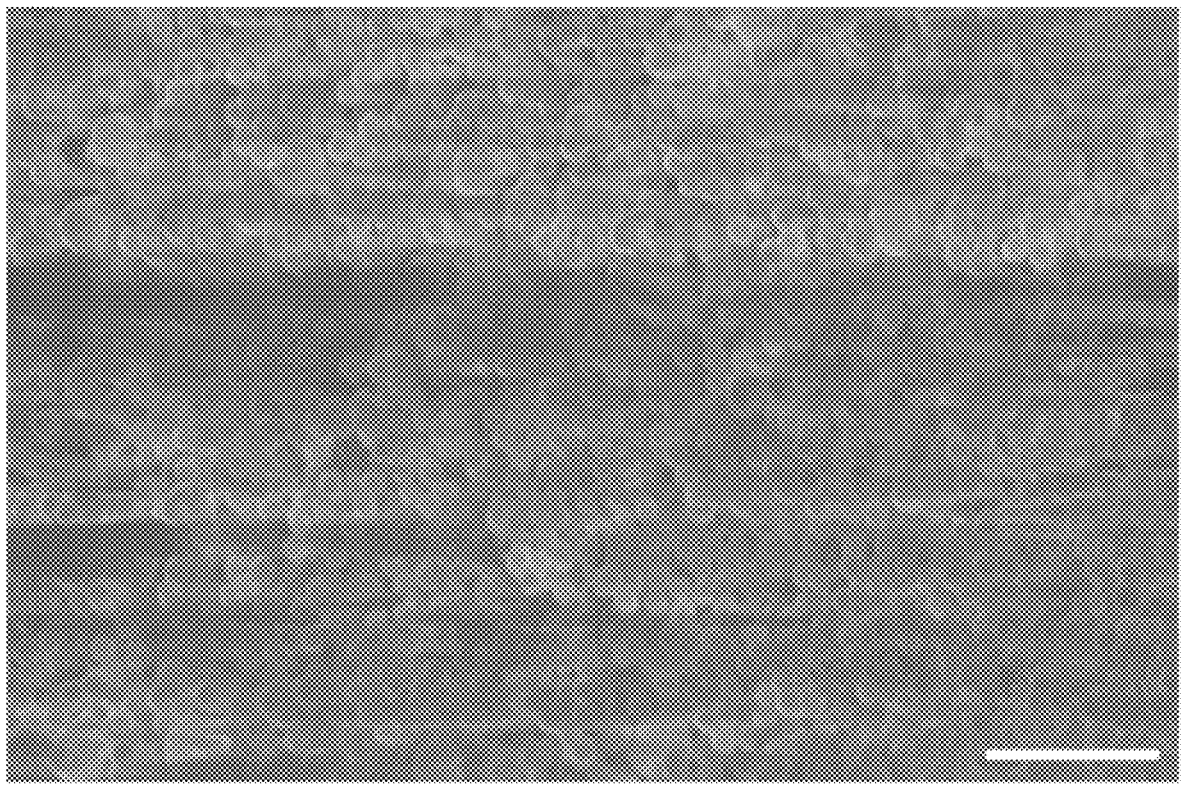
FIG. 5A is a scanning electron microscopy image of the surface morphology of pristine PVDF powder.
Figure 5B:
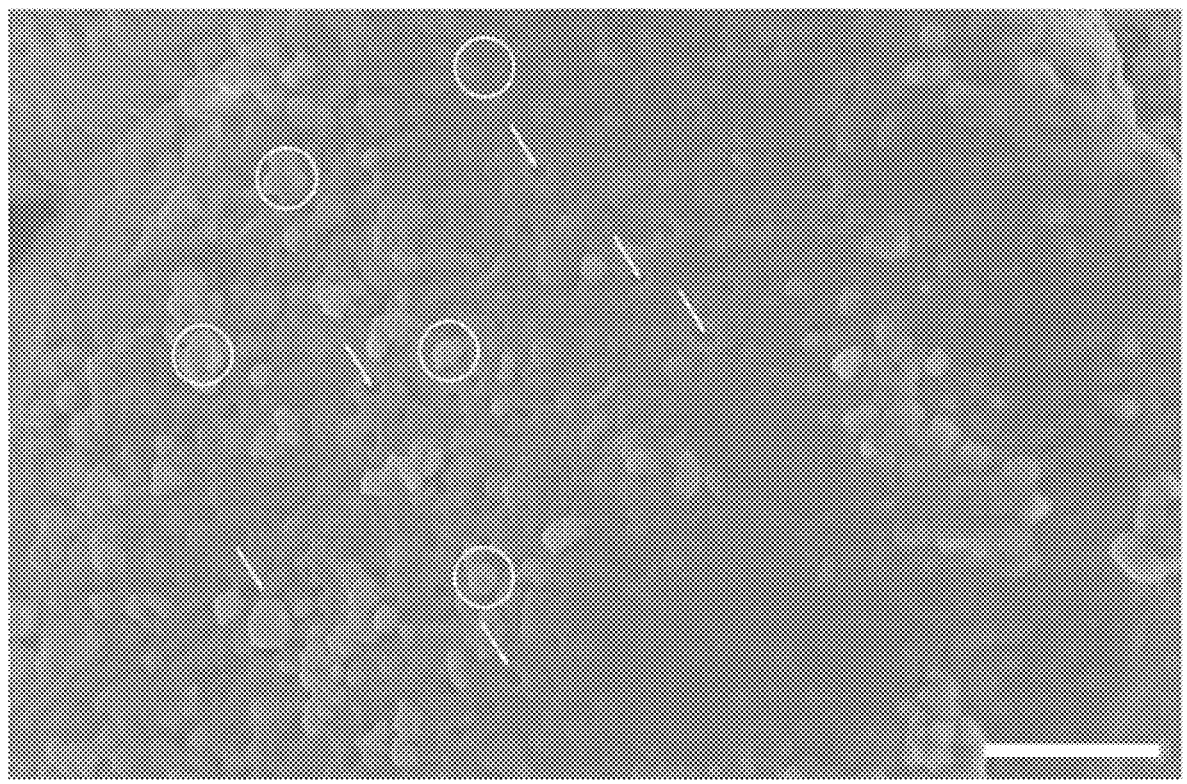
FIG. 5B is a scanning electron microscopy image of the surface morphology of PVDF recovered according to some embodiments of the present disclosure from homemade composite LCO films.

Referring now to FIGS. 5A-5B, the surface morphology of PVDF binder were evaluated before and after recovery with SEM. As-received PVDF powder was comprised of primary particles with a diameter d=284±28 nm. After recovery, the same PVDF showed primary particles with d=292±62 nm as well as microscopic pores with d=148±54 nm. Consistency in the particle size indicated the morphology of primary PVDF particles remains intact. Without wishing to be bound by theory, the observed pores/voids may arise during initial film fabrication, e.g., electrode casting and drying, and/or during the recovery and solvent evaporation process. Taken together, this indicates that solvent-based recovery does not substantially alter PVDF structure or morphology.

Figure 6A:
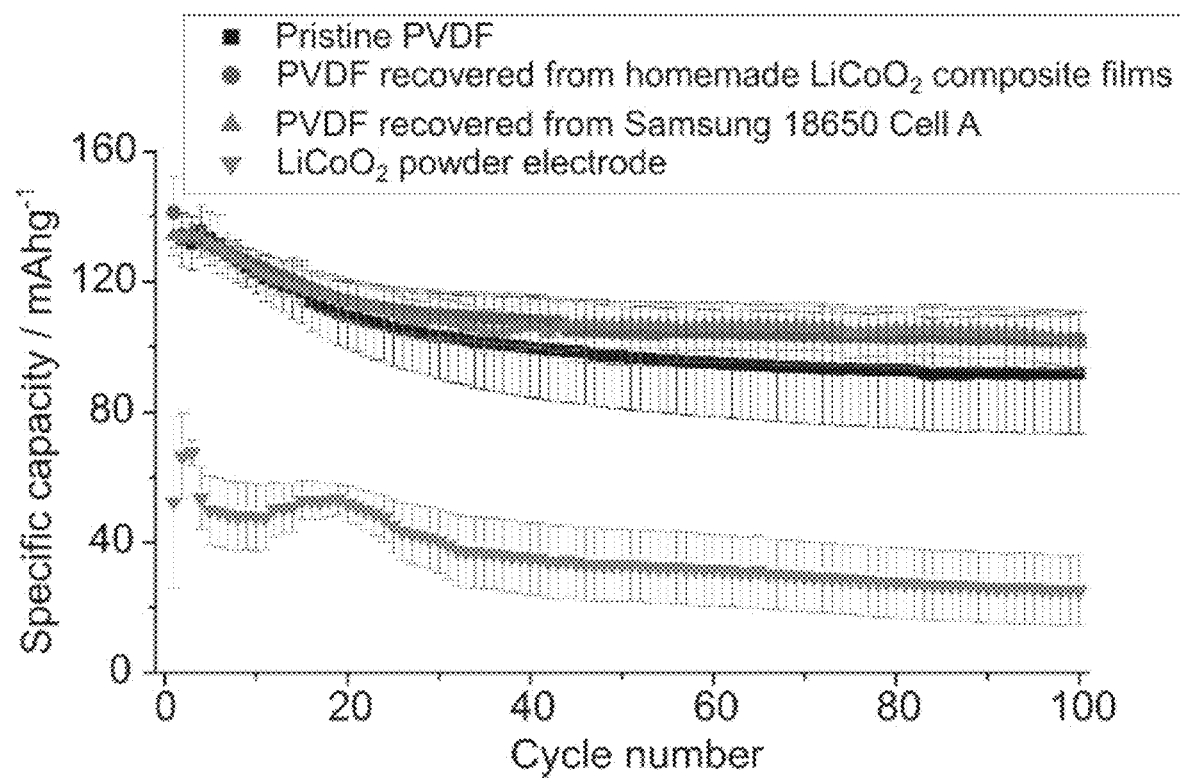
FIG. 6A is a graph showing specific charge capacities as a function of cycle number when cycled from 2.7 to 4.2 V for Li/LCO half cells without PVDF, with pristine PVDF, and with PVDF recovered according to some embodiments of the present disclosure.
Figure 6B:
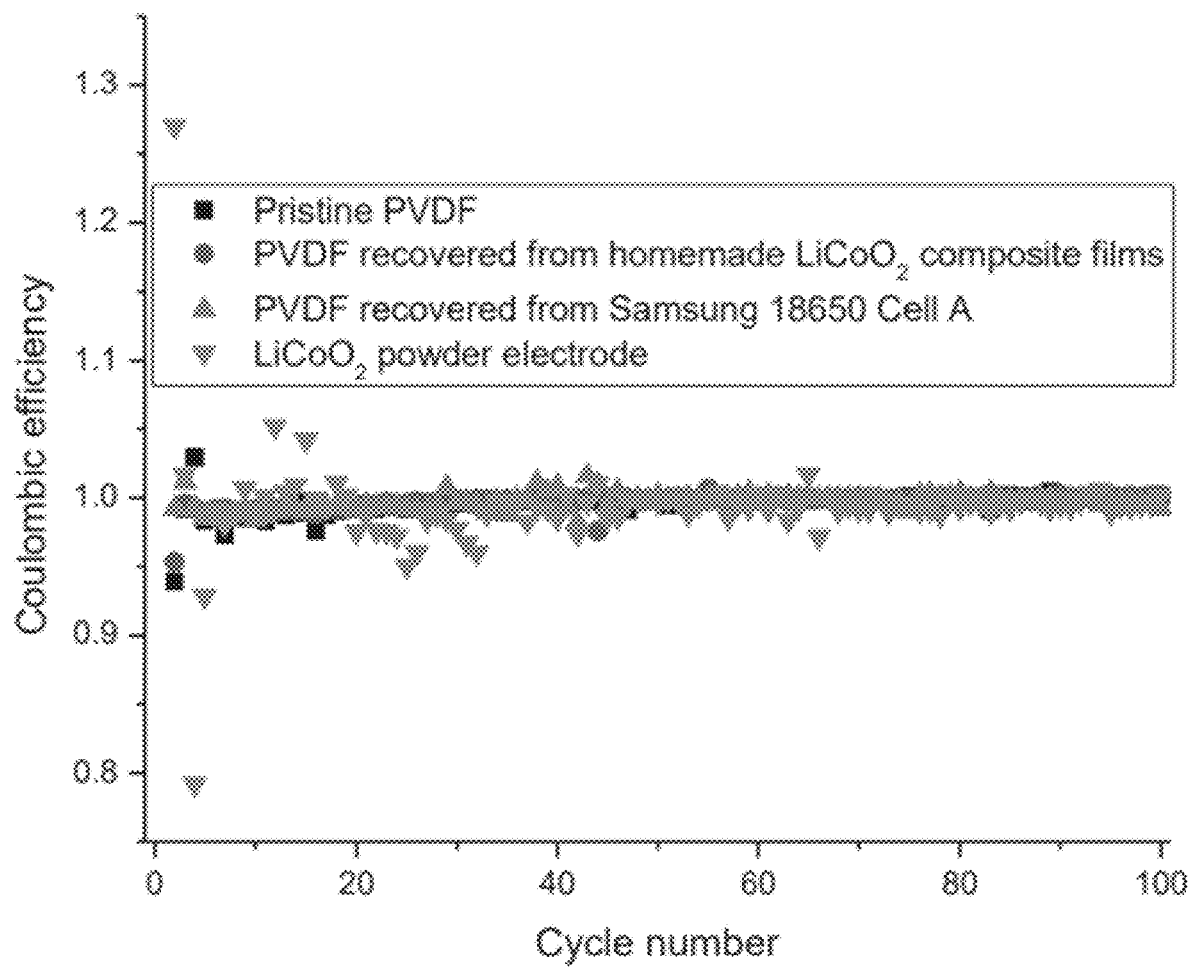
FIG. 6B is a graph showing and Coulombic efficiency as a function of cycle number for Li/LiCoO$_2$ half cells galvanostatically cycled from 2.7 to 4.2 V vs Lr/Li at C/10 using PVDF purchased from MTI (black squares, N=3) and cells including no PVDF binder (orange triangles, N=3), as well as PVDF recovered from homemade LiCoO$_2$ composite films (red circles, N=5) and from 18650 Samsung Cell A (green triangles, N=8) according to some embodiments of the present disclosure.

Referring now to FIG. 6A, the performance of PVDF extracted from homemade composite and commercial cells in Li/LCO half cells was compared to cells made with pristine PVDF. Direct comparison of batteries including pristine PVDF (FIG. 6A, black squares) and PVDF recovered from homemade films and Cell A (FIG. 6A, red circles and green triangles) indicated that electrochemical performance is higher for recovered PVDF than pristine PVDF (65% capacity retention for pristine PVDF vs. 72% for PVDF recovered from homemade films, 76% for PVDF recovered from Cell A), providing a motivation to reuse PVDF from spent cells. The capacity retention values found using pristine PVDF are typical for Li/LCO half cells cycled from 2.7 to 4.2 V vs Li+/Li). In contrast, when no binder is used, cells exhibited low capacity values almost immediately (FIG. 6A, orange triangles), which is consistent with work showing that binder minimizes mechanical stress in the electrode and prevents damage to the electrode microstructure. Average Coulombic efficiencies of cells made with all PVDF compositions was consistently ~99.6%, while the average Coulombic efficiency of binder-free cells was slightly slower (99.3%) over 100 cycles (see FIG. 6B). It appears that conditioning of polymers during cycling may improve electrochemical behavior downstream.

Figure 7:
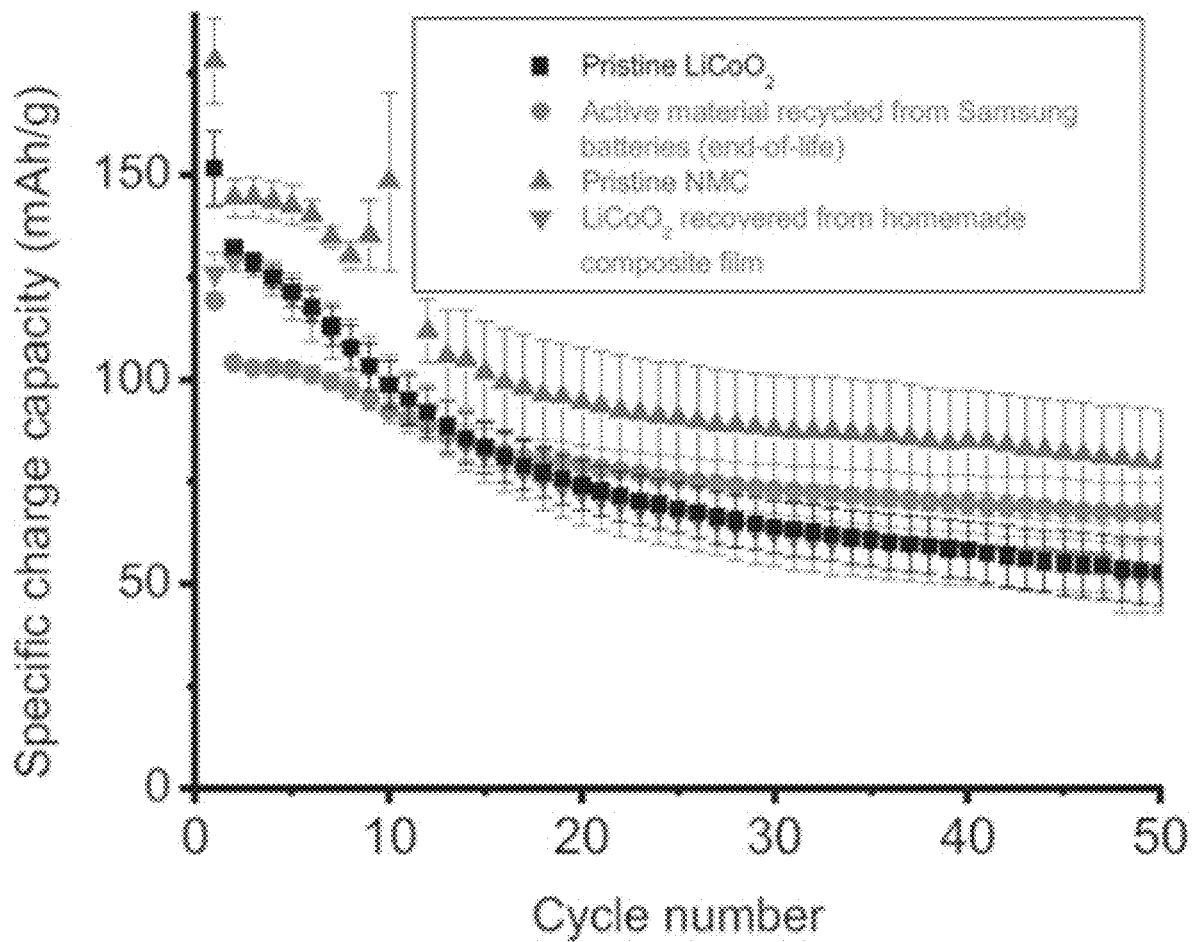
FIG. 7 is a graph showing average specific charge capacities as a function of cycle number when cycled from 2.0 to 4.2 V for Li/LCO half cells with a powder LCO electrode, pristine LCO, and with LCO recovered according to some embodiments of the present disclosure.

Referring now to FIG. 7, as the solvent-based recovery methods of the present disclosure eliminate the formation of HF etchants during cathode recycling, the electrochemical performance of recovered LCO was also tested. After separation, active materials were collected from the top of the alumina column and analyzed by XRD and SEM to evaluate composition and morphology. The concern was that i) electrochemical cycling would alter the crystallographic structure of the active material and/or ii) solvent-based removal of binder would alter the surface morphology of the active material, both of which may hinder direct cathode recycling efforts.

Bare Al current collectors were recovered from the top of the alumina column. Similarly, the active materials in the cathode, LCO/NMC111, along the conductive carbon, were scraped from the top of alumina column with 80-85% recovery, washed with THF, dried at 80° C., and characterized by PXRD and SEM. Prior to re-use, the carbon black was removed by heating the powders in air at 800° C. for 2 h, until carbon remnants were no longer observed in the SEM.

Once pure active materials were obtained, they were used to make composite cathode films and cycled in Li half cells. Active materials recovered from both homemade LCO films and cycled Samsung 18650 batteries (Cell A) were used to make electrodes at 8:1:1 active material:C:PVDF after calcination at 800° C. These electrodes were then cycled in Li half cells at C/10 between 4.2 and 2 V vs Li+/Li. The capacity retention of recycled LCO (green triangles) is nearly identical to that of pristine cells (black squares), indicating that solvent-based recovery leads to reproducible performance. Compared to Li|LCO half cells fabricated using pristine LCO, cells made using recycled active material exhibited higher capacity retention over 50 cycles (35% for pristine LCO vs 54% for recycled homemade LCO film vs 56% for recycled Samsung cathode). Li|LCO half cells fabricated with active material from commercial Samsung batteries exhibited improved performance over cells using both pristine LCO and LCO recycled from homemade electrodes, yet lower capacity than pristine NMC electrodes. The electrochemistry is consistent with the characterization data, which indicates that the Samsung cathode includes a mixture of LCO and NMC, where the observed capacity at 50 cycles (67±7 mAh/g) is between that of NMC (80±13 mAh/g) and recycled LCO (52±9 mAh/g).

Some exemplary embodiments showing recovery of PVDF with THF:NMP for the structural characterization presented here used a solid-to-liquid (S/L) ratio of approximately 1:(115±25) g:mL. In an effort to reduce potential overall costs, lower limits for S/L were explored. Using THF:NMP at the lab scale, it was shown that a S/L ratio of 1:(5.8±0.6) g:mL achieved full delamination from the current collector (see Table 3 below). Without wishing to be bound by theory, an estimate for the energy intensity of soaking indicates that increasing from a S/L ratio of 1:1 to 1:5 leads to an increase in energy intensity from approximately 8 to 27 mmBtu/ton PVDF. In contrast, the energy intensity for the production of raw PVDF is estimated to be approximately 21 mmBtu/ton (based on PVC).

TABLE 3

Summary of composite cathode film properties and PVDF recovery parameters with minimal solvent volume.

| Battery Type | Mass of cathode (mg) | Starting PVDF Mass (mg) | PVDF Recovered (mg) | % Recovery | S/L ratio (g:mL) |
|---|---|---|---|---|---|
| Soaked | 3,400 | 350 | 178 | 51 | 1:6 |
| Homemade | 3,630 | 302 | 70 | 23 | 1:5.5 |
| Film (LCO) | 3,000 | 300 | 80 | 27 | 1:67 |
|  | 3,956 | 400 | 130 | 33 | 1:5 |

Methods and systems of the present disclosure present a strategy to not only remove binder in direct cathode recycling but close the loop on the plastic waste that would otherwise be produced. The methods also demonstrate the structure, purity, and reuse of polymeric binder, e.g., PVDF, recovered from spent lithium-ion battery cathodes. These methods are a low temperature, solvent-based route to recover and recycle polymeric binder that is used in composite electrode films in research-grade and commercial Li-ion batteries. As demonstrated with PVDF, binder can be recovered with high yield (81±3%) from batteries cathodes of the compositions $LiCoO_2$ and $LiNi_xMn_yCo_zO_2$ ($x=\frac{1}{3}$, $y=\frac{1}{3}$, $z=\frac{1}{3}$) and related compositions at end-of-life. DMF, NMP, and/or mixtures of THF with DMF or NMP can be used to recover PVDF from composite electrode films at low temperatures (80-90° C.). Without wishing to be bound by theory, the recovery process delaminates the transition metal oxide active material, conductive carbon, and PVDF from the aluminum current collector without damaging the current collector, leaving behind at least substantially pure Al. The solvate can be purified through an $Al_2O_3$ column that separates carbon and transition metal oxide from PVDF, still allowing recycling of expensive transition metals, such as Co or Ni, through traditional pyrometallurgical or direct cathode recycling processes. SEM analyses confirm that the cathode material is unchanged during PVDF removal. The recovered PVDF can be used in subsequent batteries that achieve indistinguishable performance from cathode films made with pristine PVDF with little to no structural degradation occurring during the recovery process.

The embodiments of the present disclosure provide an environmentally friendly route to reduce greenhouse gas emissions produced during battery recycling and provides a route to reuse environmentally persistent plastic binders in subsequent battery formulations. The active material recovered from THF:NMP soaking does not suffer from HF etching and may provide an additional incentive to apply this approach.

This process is applicable to and likely of interest to direct cathode recycling industries. This technology can be of industrial and commercial use for two reasons. (1) Current recycling methods to extract transition metals for re-use focus on pyrometallurgy without prior separation of PVDF binder, burning off the polymeric binder during this process. This ultrahigh temperature process leads to the production of emissions that are serious concerns for the environment (HF, perfluorocarbons) and use scrubbers to clean the exhaust air. Removal of these components in the recycling process prior to metal recycling would remove this concern. In general, there is a push to move towards direct cathode recycling approaches to reduce greenhouse gas emissions related to pyrometallurgical processing. (2) The massive amount of electric vehicles and on- and off-grid storage units expected to come online in the next few decades will lead to unprecedented Li-ion battery waste. Battery waste of this magnitude will lead to a large accumulation of plastics from the binder, burdening an already dismal plastic epidemic. Developing new strategies to re-use PVDF binders in battery applications closes this loop and eliminates the creation of additional plastic waste in the environment.

Although the invention has been described and illustrated with respect to exemplary embodiments thereof, it should be understood by those skilled in the art that the foregoing and various other changes, omissions and additions may be made therein and thereto, without parting from the spirit and scope of the present invention.

What is claimed is:

1. A method of recovering materials from a cathode film, comprising:
   contacting a cathode film isolated from a battery with a solvent including N,N-dimethylformamide (DMF), N-methyl-2-pyrrolidine (NMP), a tetrahydrofuran (THF):NMP mixture, or a THF:DMF mixture, the cathode film including a binder including poly(vinylidene fluoride) (PVDF);
   dissolving the PVDF from the cathode film with the solvent to produce a product solution; and
   isolating a PVDF product solution from the product solution via alumina column separation.

2. The method according to claim 1, wherein the cathode film is contacted with a THF:NMP mixture, and the volume ratio in the THF:NMP mixture is about 50:50.

3. The method according to claim 1, wherein the cathode film is contacted with a THF:DMF mixture, and the volume ratio in the THF:DMF mixtures is about 50:50.

4. The method according to claim 1, further comprising:
   concentrating the PVDF product solution under vacuum; and
   precipitating a PVDF product from the PVDF product solution in an ether solution.

5. The method according to claim 1, wherein the cathode film further comprises an active material, wherein the method includes:
   retrieving an active material product from the alumina column.

6. The method according to claim 1, wherein the average molecular weight of PVDF in the PVDF product is between about 400 kDa and about 950 kDa.

7. The method according to claim 1, wherein the ratio of solid cathode film to solvent is between about 1:1 g:mL and about 1:7 g:mL.

8. A method of recovering materials from a cathode film, comprising:
   isolating a cathode film from a battery, the cathode film including a binder, an active material, and a conductive substrate, wherein the binder includes poly(vinylidene fluoride) (PVDF);
   washing the cathode film with an electrolyte;
   washing the cathode film with one or more first solvents to remove the electrolyte;
   contacting the cathode film with a second solvent including N,N-dimethylformamide (DMF), N-methyl-2-pyrrolidine (NMP), a tetrahydrofuran (THF):NMP mixture, or a THF:DMF mixture to form a product solution;
   applying the product solution to an alumina column separator to isolate a PVDF product solution from the product solution; and
   precipitating a PVDF product from the PVDF product solution.

9. The method according to claim 8, wherein the second solvent is a THF:NMP mixture, and the volume ratio in the THF:NMP mixture is about 50:50.

10. The method according to claim 8, wherein the second solvent is a THF:DMF mixture, and the volume ratio in the THF:DMF mixtures is about 50:50.

11. The method according to claim 8, wherein the ratio of solid cathode film to second solvent is between about 1:1 g:mL and about 1:7 g:mL.

12. The method according to claim 8, wherein applying the product solution to an alumina column separator further comprises:
diluting the product solution between about 5 times and about 10 times with THF.

13. The method according to claim 8, wherein applying the product solution to an alumina column separator further comprises:
passing the product solution through an alumina column separator two or more times.

14. The method according to claim 8, wherein contacting the cathode film with a second solvent further comprises a heat application process, a sonication process, or combinations thereof.

15. The method according to claim 8, further comprising:
retrieving an active material product from the alumina column; and
retrieving a conductive substrate product from the alumina column.

16. The method according to claim 8, wherein the average molecular weight of the precipitated PVDF is between about 400 kDa and about 950 kDa.

17. A method of producing a battery from recycled materials, comprising:
isolating a cathode film from an end-of-life battery, the cathode film including a binder including poly(vinylidene fluoride) (PVDF);
washing the cathode film with an electrolyte;
washing the cathode film with one or more first solvents to remove the electrolyte;
drying the cathode film;
immersing the dried cathode film with a second solvent including N,N-dimethylformamide (DMF), N-methyl-2-pyrrolidine (NMP), a tetrahydrofuran (THF):NMP mixture, or a THF:DMF mixture to form a product solution;
passing the product solution through an alumina column separator;
isolating a PVDF product solution from the product solution;
precipitating a PVDF product from the PVDF product solution; and
incorporating the PVDF product as a binder in a new cathode film.

18. The method according to claim 17, wherein the second solvent is:
a THF:NMP mixture having a volume ratio of about 50:50, or
a THF:DMF mixture having a volume ratio of about 50:50.

19. The method according to claim 17, wherein the cathode film further comprises an active material, wherein the method includes:
retrieving an active material product from the alumina column, and
incorporating the active material product into a new cathode film.

20. The method according to claim 17, wherein immersing the dried cathode film with a second solvent further comprises a heat application process, a sonication process, or combinations thereof, wherein the ratio of solid cathode film to second solvent is between about 1:1 g:mL and about 1:7 g:mL.

* * * * *